(12) United States Patent
Ban

(10) Patent No.: US 9,581,184 B2
(45) Date of Patent: Feb. 28, 2017

(54) SCREW FOR COUPLING WOODEN MEMBERS TOGETHER

(71) Applicant: SAEHAN ELECTRONICS, CO., Chungju-si, Chungcheongbuk-do (KR)

(72) Inventor: Young-Kuuk Ban, Chungju-si (KR)

(73) Assignee: Sae Han Co., Ltd., Chungju-Si, Chungcheon (KR)

( * ) Notice: Subject to any disclaimer, the term of this patent is extended or adjusted under 35 U.S.C. 154(b) by 189 days.

(21) Appl. No.: 14/555,776

(22) Filed: Nov. 28, 2014

(65) Prior Publication Data

US 2015/0147137 A1 May 28, 2015

(30) Foreign Application Priority Data

Nov. 28, 2013 (KR) .................. 20-2013-0009830 U

(51) Int. Cl.
*F16B 25/10* (2006.01)
*F16B 25/00* (2006.01)
*F16B 35/06* (2006.01)

(52) U.S. Cl.
CPC ........ *F16B 25/106* (2013.01); *F16B 25/0015* (2013.01); *F16B 35/065* (2013.01)

(58) Field of Classification Search
CPC .... F16B 35/065; F16B 25/10; F16B 25/0015; F16B 25/0031; F16B 25/0052
USPC .............................................. 411/399, 387.2
See application file for complete search history.

(56) References Cited

U.S. PATENT DOCUMENTS

| 430,236 | A | * | 6/1890 | Rogers | F16B 4/004 411/424 |
|---|---|---|---|---|---|
| 5,772,376 | A | * | 6/1998 | Konig | F16B 35/065 411/188 |
| 6,394,725 | B1 | * | 5/2002 | Dicke | F16B 35/065 411/188 |
| 6,698,987 | B1 | * | 3/2004 | Dicke | F16B 25/0031 411/387.4 |
| 7,293,947 | B2 | * | 11/2007 | Craven | F16B 35/065 411/387.2 |
| 9,297,402 | B2 | * | 3/2016 | Hughes | F16B 25/106 |
| 2007/0224020 | A1 | * | 9/2007 | Hsieh | F16B 35/06 411/399 |
| 2015/0063946 | A1 | * | 3/2015 | Park | F16B 25/0036 411/386 |

* cited by examiner

*Primary Examiner* — Flemming Saether
(74) *Attorney, Agent, or Firm* — Davis & Bujold PLLC; Michael J. Bujold

(57) ABSTRACT

There is provided a screw for fastening a wooden member which includes: a shank that extends along a datum line; a head that is disposed at an end of the shank and has a plate portion having a cross-section that narrows as it goes to the shank such that the boundary of the cross-section and the datum line make a plate angle; and a tapered blade that protrudes from the outer side of the plate portion, has a bottom perpendicular to the datum line and a side making an obtuse angle with the bottom, and has a taper angle that is made by the side and the datum line and is 2.50° to 12.5° smaller than the plate angle.

20 Claims, 7 Drawing Sheets

SCREW FOR COUPLING WOODEN MEMBERS TOGETHER

CROSS-REFERENCE TO RELATED APPLICATIONS

This application claims priority to Korean Utility Model Application No. 2013-0009830, filed on Nov. 28, 2013, which is herein incorporated by reference in its entirety.

BACKGROUND OF THE INVENTION

Field of the Invention

The present invention relates to a screw for fastening a wooden member.

Description of the Related Art

In general, screws are used to fasten furniture or wooden members for construction.

In use of screws in the related art, a user combines objects by forming a screw hole in one of the objects and then tightens a screw in the hole. Accordingly, there is a need of a first step of forming a hole and a second step of inserting a screw into the hole. Therefore, the entire process is complicated and there is a limit in increasing efficiency of work by reducing the work time.

As an alternative, drill type screws with a blade on the end of the shank have been used. The drill type screws can be driven into a wooden member riot through two steps, but at a time.

SUMMARY OF THE INVENTION

An object of the present invention is to provide a screw for fastening a wooden member which makes it possible to cleanly finish the portion, where the screw is driven, by effectively removing the film on a wooden member.

Another object of the present invention is to provide a screw for fastening a wooden member which applies a low load to a wooden member throughout the process, including not only the earlier step of putting the shank into the wooden member and the latter step of putting the head into the wooden member, when it is driven into the wooden member.

According to an aspect of the present invention, there is provided a screw for fastening a wooden member which includes: a shank that extends along a datum line; a head that is disposed at an end of the shank and has a plate portion having a cross-section that narrows as it goes to the shank such that the boundary of the cross-section and the datum line make a plate angle; and a tapered blade that protrudes from the outer side of the plate portion, has a bottom perpendicular to the datum line and a side making an obtuse angle with the bottom, and has a taper angle that is made by the side and the datum line and is 2.5° to 12.5° smaller than the plate angle.

The plate angle may be 27.5° to 30°.

The shank may have a threaded portion with a thread thereon, and the bottom of the tapered blade may be positioned at a distance corresponding to one pitch to one and a half pitch of the thread further from the head than the bottom of the plate portion.

The shank may further have a neck connecting the threaded portion and the plate portion to each other, and the neck may have a reinforcing portion having an outer diameter larger by 6.5% to 8% than the other portion: of the neck.

The head may further have a disc portion connected to a free end of the plate portion and having a larger cross-sectional area than the plate portion.

The screw may further include a horizontal blade protruding from the bottom of the disc portion and connected to the tapered blade.

The horizontal blade may protrude from the disc portion, by 25% to 45% of the thickness of the disc portion.

The screw may further include a circular blade protruding from the bottom of the disc portion and making a circle.

The circular blade may be formed such that the edge of the disc portion is bent to make an arc cross-section toward the shank.

The tapered blade and the horizontal blade may be disposed inside a range defined by the circular blade, in the range of the disc portion.

The horizontal blade may protrude from the disc portion further than the circular blade.

The bottom of the tapered blade may be parallel with the bottom of the horizontal blade.

The length of the bottom of the tapered blade may be 7.5% to 12.5% of the radius of the disc portion.

The shank may further have an end blade that is formed at a free end of the shank and has an internal angle of 40° to 50°.

The thickness of the tapered blade may be 0.25 to 0.35 mm.

According to another aspect of the present invention, there is provided a screw for fastening a wooden member which includes: a shank that extends along a datum line and has a threaded portion with a thread thereon and an end blade formed at one end; a head that is disposed at the other end of the shank and has a plate portion, which has a cross-section that narrows as it goes to the shank such that the boundary of the cross-section and the datum line make a plate angle, and disc portion at a free end of the plate portion; a tapered blade that protrudes from the outer side of the plate portion, has a bottom perpendicular to the datum line and a side making an obtuse angle with the bottom, and has a tapered angle smaller than the plate angle; a horizontal blade that protrudes from the bottom of the disc portion and has a side parallel with the bottom of the tapered blade; and a circular blade that protrudes from the bottom of the disc portion and surrounds the tapered blade and the horizontal blade.

The bottom of the tapered blade may be positioned at a distance corresponding to one pitch to one and a half pitch of the thread further from the head than the bottom of the plate portion.

The shank may further have a neck connecting the threaded portion and the plate portion to each other, and the neck may have a reinforcing portion having an outer diameter larger by 6.5% to 8% than the other portion of the neck.

The length of the bottom of the tapered blade may be 7.5% to 12.5% of the radius of the disc portion.

The plate angle may be 27.5° to 30° and the taper angle may be 17.5° to 25°.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
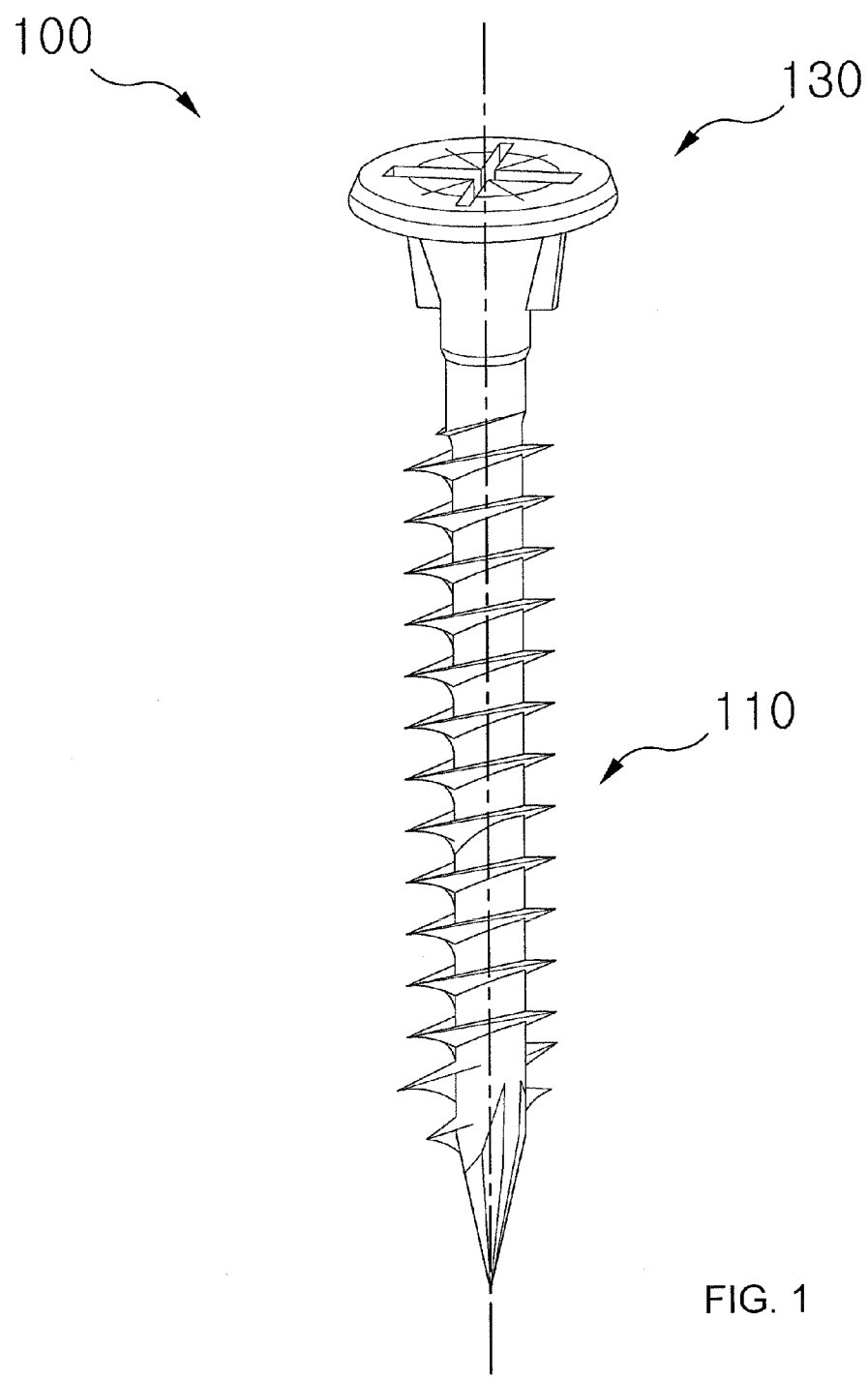
FIG. 1 is a perspective view illustrating a screw 100 for fastening a wooden member according to an embodiment of the present invention.

Hereinafter, a screw for fastening a wooden member according to an embodiment of the present invention is described in detail with reference to the accompanying drawings. In the present specification, like or similar components in different exemplary embodiments will be assigned like or similar reference numerals, and corresponding descriptions will be omitted.

FIG. 1 is a perspective view illustrating a screw 100 for fastening a wooden member according to an embodiment of the or present invention.

Referring to FIG. 1, the screw 100 may have a shank 110, a head 130, a tapered blade 150, a horizontal blade 170, and a circular blade 190.

The shank 110 may have the shape of a rod extending along a datum line S. The shank 110 may have a threaded portion 111, a neck 115, and an end blade 119.

The threaded portion iii is formed around the shank 110. The threaded portion 111 has a continuous thread 112. The neck 115 is a portion connecting the threaded portion 111 and the head 130 to each other.

The neck 115 may have a reinforcing portion 116 larger in diameter than the other portion. In detail, the reinforcing portion 116 has an outer diameter 6.5 to 8% larger than the outer diameter of the other portion of the neck 115. The screw 100 (embodiment) having the reinforcing portion 116 was compared with another screw (comparative example) without the reinforcing portion 116.

TABLE 1

| Item | Minimum torque | Maximum torque | Measurement condition |
|---|---|---|---|
| Comparative example | 29 | 33 | Measured after plating |
| Embodiment | 36 | 39 | Measured after plating |

As can be seen in Table 1, the instant torque that the screw without the reinforcing portion can resist when it is driven into a wooden member WM was 29 kgf/cm² to 33 kgf/cm².

In general, instant torque applied to a screw driven into a wooden member WM is 22 kgf/cm² to 28 kgf/cm². Accordingly, there may be no problem with the comparative example in a common state.

However, torque over the level described above may be applied to screws, depending on the position and method of a user driving the screws and the density of wooden members WM. Accordingly, considering the safety factor of screws, instant torque that screws can resist may be set over 35 kgf/cm.

The screw 100 with the reinforcing portion 116 according to the present invention can resist instant torque of 36 kgf/cm² to 39 kgf/cm², so it can be seen that the screw 100 coincides with the standard described above. As a result of the test, it can be seen that when the outer diameter of the reinforcing portion 116 is 6.5% smaller than that of the other portion of the neck 115, the possibility that the neck 115 is broken by torque concentrated when the head 130 is driven by a tool increases. Further, it can be seen from test that when the outer diameter of the reinforcing portion 116 is over 8% larger than that of the other portion of the neck 115, it is unnecessarily large reinforcement. Further, the reinforcing portion 116 interferes with the screw 100 driven into a wooden member WM. Accordingly, the reinforcing portion 116 may be smaller in outer diameter than the threaded portion 112.

It can be seen from the test that it is possible to achieve instant torque increased by 20% in comparison to the existing screws by having the reinforcing portion 116 in the present invention.

The end blade 119 is a blade formed at a free end of the shank 110. The interior angle γ of the end blade 119 may be 50° to 60°. Table 2 with test results according to angles may be referred for the interior angle of an end γ. In Table 2, a tightening speed is a speed required to tighten a screw with the smallest number of idling in the earlier stage of driving the screw, and the smaller the tightening speed, the better the screw. Further, a blade size means the height of the blade and determines production and discharge of chips.

TABLE 2

| Interior angle | Blade size (mm) | Tightening speed (rev/s) | Suitability |
|---|---|---|---|
| 30° to 40° | 0.664 | 2.56 | Idling, low tightening speed, bad discharge of chip |
| 40° to 50° | 0.803 | 1.99 | slight idling, low tightening speed, poor discharge of chip |
| 50° to 60° | 1.119 | 1.17 | tightened without idling, good discharge of chip |
| 60° to 70° | 1.145 | 1.77 | low tightening speed, excellent discharge of chip |
| 70° to 80° | 0.994 | 2.69 | low tightening speed, excellent discharge of chip |

As in Table 2, it can be seen that when the interior angle of an end γ is 50° to 60°, the size of the end blade 119 of the screw 100 was large in second and the tightening speed was the most excellent. Physically, the screw 100 is driven into a wooden member WM without idling and chips are also easily discharged. Further, according to the present invention, a film F (FIG. 3) is efficiently removed by the tapered blade 150, which will be described below. This is because the degree of coming-off of the film F when the end blade 119 is driven into the film F at the angles listed in Table 2 is low.

In contrast, for example, when the interior angle of an end is 40° to 50°, it can be seen that the blade size is 0.803 small and the tightening speed is 1.99 large too. Further, physically, it can be seen that the screws idle and chips are not discharged well. Further, it can be seen that when the interior angle of an end is 60° to 70°, the blade size is 1.145 the largest, but the tightening speed is 1.77 larger than that of the screw of the present invention. Further, physically, it can be seen that discharge of chips is excellent, but the tightening speed is low.

The head 130 is positioned at an end of the shank 110. The head 130 may have a plate portion 131 and a disc portion 135.

The plate portion 131 has a cross-sectional area that becomes narrower as it goes to the shank 110. In other words, it may have a frustrated conical shape with the largest cross-sectional area at the top and the smallest cross-sectional area at the bottom in the figures. An insertion groove in which a tool is inserted with the disc portion 135 is formed on the plate portion 131, which will be described below. The boundary 132 of the plate portion 131 makes an acute angle with the datum line S and the angle may be called a plate angle α. The plate angle α is 27.5° to 30°. When the plate angle α is less than 27.5°, the tapered blade 150 may become excessively wider as it goes to the disc portion 135, and when it is larger than 30°, the tapered blade 150 may become excessively narrower as it goes to the disc portion 135. The tapered blade 150 may extend with a predetermined width along the boundary 132 of the plate portion 131, within the plate angle α.

The disc portion 135 is formed opposite the neck 115 with the plate portion 131 therebetween. The disc portion 135, which is formed in the shape of a circular plate, has a larger cross-sectional area than the plate portion 131. As described above, the disc portion 135 has an insertion groove into which a tool is inserted.

The tapered blade 150 is a blade protruding from the outer side of the plate portion 131. The tapered blade 150 may be 0.25 to 0.35 mm thick. When the tapered blade 150 is less than 0.25 mm, it is likely to be broken while being driven into the wooden member WM (FIG. 3), or when it is thick more than 0.35 mm, the blade that comes in contact with the film F is obtuse, so it may not cut through the film F well. Although the tapered blade 150 is composed of a pair of symmetric blades, the number of blades may be changed.

The boundary of the tapered blade 150 is defined by the bottom 151 and the side 153.

The bottom 151 is perpendicular to the datum line S. Accordingly, the bottom 151 is formed in parallel with a film F (FIG. 3) to be cut. The length of the bottom 151 may be 7.5% to 12.5% of the radius of the disc portion 135. When the length of the bottom 151 is less than 7.5% of the radius of the disc portion 135, the length of the bottom 151 is not sufficient, so a film cannot be cut well, or when it is larger than 12.5%, the torque at the free end of the bottom 151 increases, so the load that is applied when the screw is driven into a wooden member WM may excessively increase. The bottom 151 may be positioned at a predetermined distance under the bottom of the plate portion 131. In detail, the predetermined distance may be one pitch or one and a half pitch of the thread 112. When the bottom 151 is positioned at a distance corresponding to one pitch of the thread 112 under the plate portion 131, as the screw 100 is turned one time, the bottom 151 cuts through the film F by turning one time and is then driven into the wooden member WM. However, when the bottom 151 is positioned at a predetermined distance over 1.5 pitch under the plate portion 131, the bottom 151 becomes necessarily shorter that much. Further, due to the short bottom 151, the joint between the bottom 151 and the side 153 are formed like being rounded, so the portion of the bottom 151 which is parallel with the film F (the portion that cuts through the film F) further reduces. Accordingly, the function of the bottom 151 which cuts through the film F is decreased too much.

The side 153 is formed at an obtuse angle from the bottom 151. The angle between the side 153 and the datum line S may be called a taper angle β. The taper angle β may be 2.5° to 12.5° smaller than the plate angle α. When the plate angle α is 27.5° to 30°, the taper angle β may be 17.5° to 25°. When the taper angle β is smaller than the plate angle α, less than 2.5°, the bottom 151 of the tapered blade 150 is short, so the bottom 151 may not cut through the film F well. When the taper angle β is smaller than the plate angle α, more than 12.5°, the bottom 151 of the tapered blade 150 is too long, so the bottom 151 can cut through the film F well, but excessive torque is generated at the free end of the bottom 151.

The horizontal blade 170 is a blade protruding from the bottom of the disc portion 135. The horizontal blade 170 may be connected to the tapered blade 150. The horizontal blade 170 may be disposed in the same plane as the plane made by the tapered blade 150. The bottom 171 of the horizontal blade 370 may be perpendicular to the datum line S, the same as the bottom 151 of the tapered blade 150. Accordingly, the bottom 171 of the horizontal blade 170 may also be disposed in parallel with the film F. The protrusion length of the horizontal blade 170 from the disc pate 135 (height width) of the horizontal blade 170 in the direction of the datum line S) may be 25% to 45% of the thickness of the disc portion 135. When the horizontal blade 170 protrudes less than 25% of the thickness of the disc portion 135, the function of cutting through the film F before the disc portion 135 (and the circular blade 190) comes in contact with the film F is insufficient, or when it protrudes more than 45%, the possibility of bending of the free end of the horizontal blade 170 (the blade coming in contact with the film F) increases.

The circular blade 190 protrudes from the bottom of the disc portion 135. The circular blade 190 has a circular shape. The circular blade 190 may be shaped such that the edge of the disc portion 135 bends toward the shank 110. Accordingly, the circular blade 190 may have an arc cross-section. The circular blade 190 is formed such that the horizontal blade 170 and the tapered blade 150 are positioned inside a range that it defines. However, the protrusion length of the circular blade 190 from the disc portion 135 may be smaller than the protrusion length of the horizontal blade 170. This is for enabling the circular blade 190 to finally cut through the film F and collect it inside, after the horizontal blade 190 cuts through the film F.

Driving the screw 100 having this configuration into a wooden member is described with reference to FIGS. 3 to 7.

Figure 2:
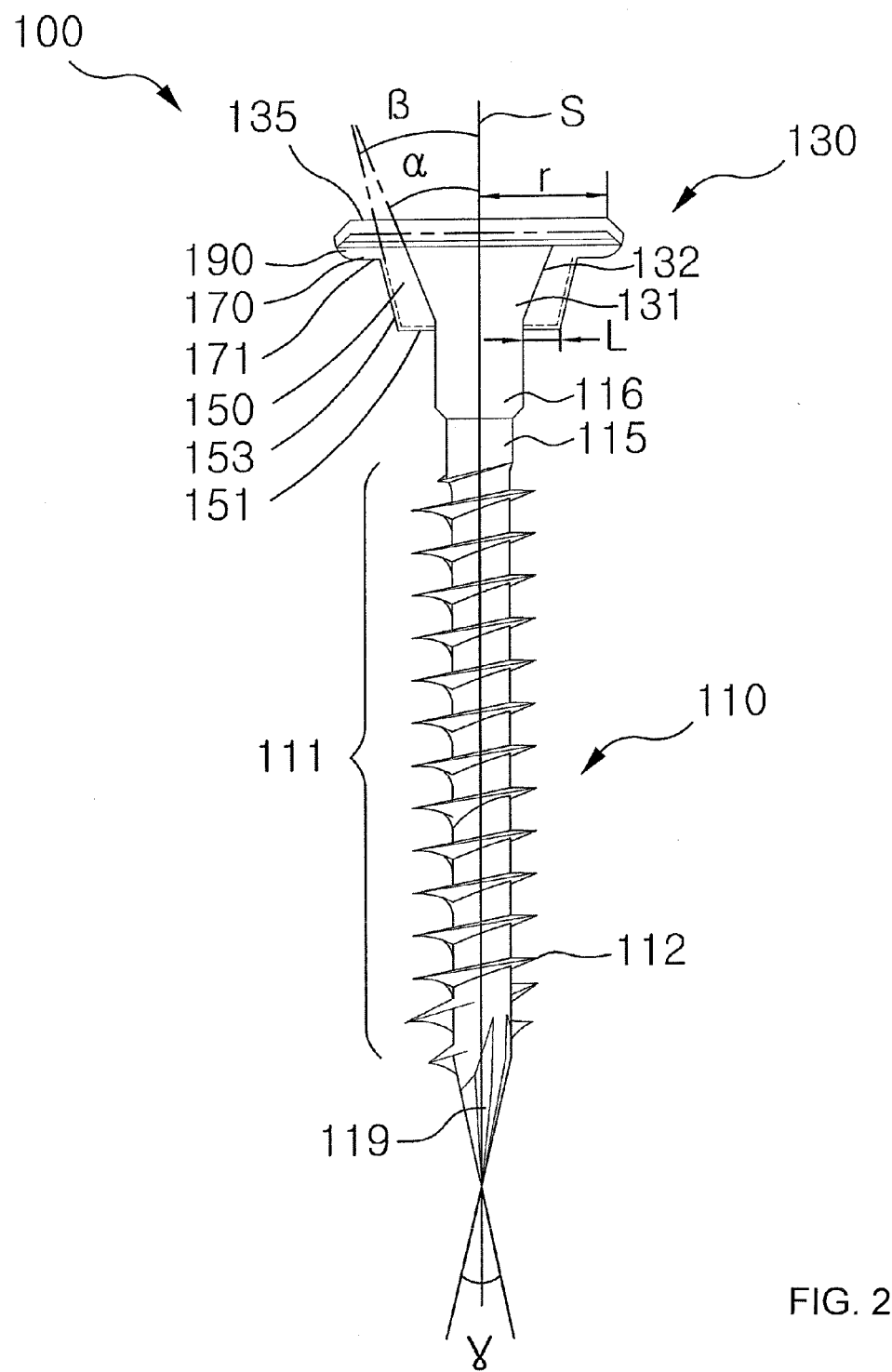
FIG. 2 is a front view of the screw 100 illustrated in FIG. 1.
Figure 3:
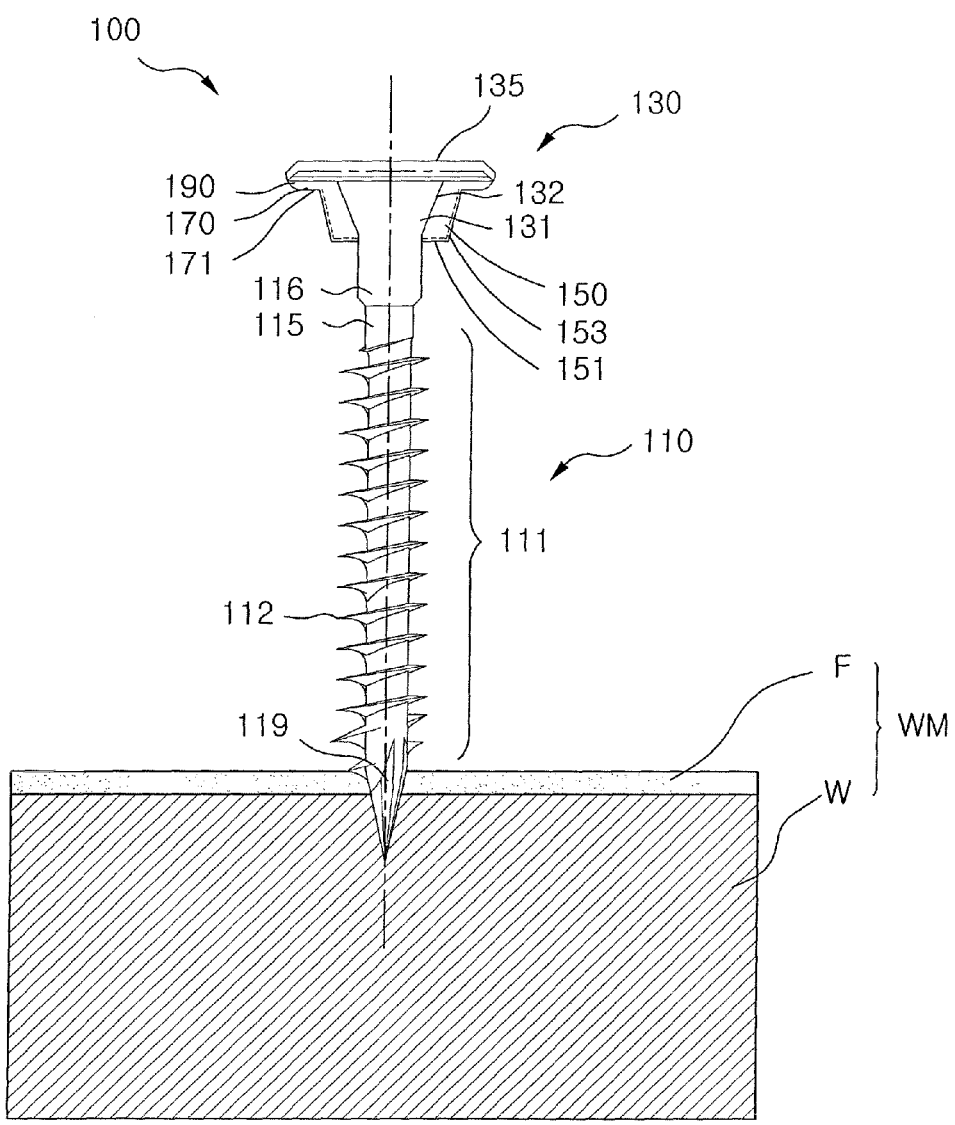
FIG. 3 is a conceptual diagram illustrating the earlier step of driving the screw 100 of FIG. 2 into a wooden member WM.

First, FIG. 3 is a conceptual diagram illustrating the earlier step of driving the screw 100 of FIG. 2 into a wooden member WM.

Referring to FIG. 3, the end with the end blade 119 of the shank 110 of the screw 100 is aligned on a wooden member WM.

As a tool inserted in the insertion groove on the head 130 is turned, the end blade 119 cuts into the wood W through the film F.

Since the interior angle γ of the end blade 119 is 50° to 60°, so as can be seen from Table 2, the screw can be tightened at a low tightening speed without idling. Further, the size of the end blade 119 is suitable for discharging chips well. In this process, the load applied by the shank 110 cutting into the wooden member is low and the degree of coming-off of the film F is also low.

Next, primarily to thirdly cutting through the film F with the tapered blade 150, the horizontal blade 170, and the circular blade 190 is described with reference to FIGS. 4 to 6.

Figure 4:
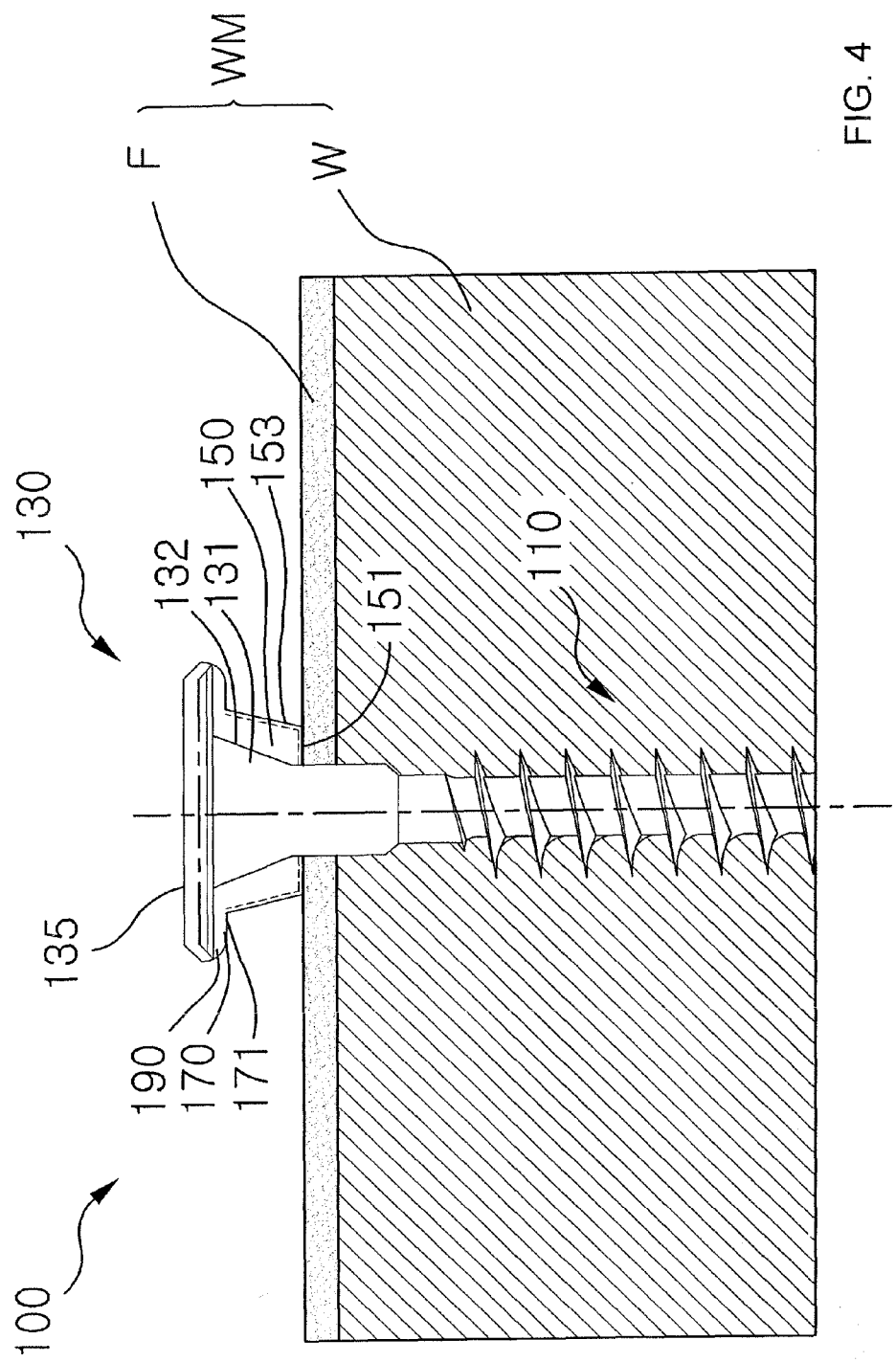
FIG. 4 is a conceptual diagram illustrating a process of primarily removing a film F with a tapered blade 150 in the latter step of driving the screw 100 of FIG. 3 into the wooden member WM.

First, FIG. 4 is a conceptual diagram illustrating a process of primarily removing the film F with the tapered blade 150 in the latter step of driving the screw 100 of FIG. 3 into a wooden member WM.

Referring to FIG. 4, the threaded portion 111 of the shank 110 of the screw 100 has been driven in a wood W. Most of the neck 115 has also been driven in the wood W.

The bottom 151 of the tapered blade 150 and the film F are in contact in parallel with each other. As the screw 100 is turned, the bottom 151 is turned, making a circle. Accordingly, the entire surface of a portion of the film F within the circle made by the bottom 151 is cut by the bottom 151 like grinding.

Cutting of the film F by the bottom 151 of the tapered blade 150 may be called primary cutting (removing) of the film F in terms of the order. In the primary cutting, since the bottom 151 is parallel with the film F, the film F can be cut without the edge (portion being in contact with the shank 110) coming off.

Figure 5:
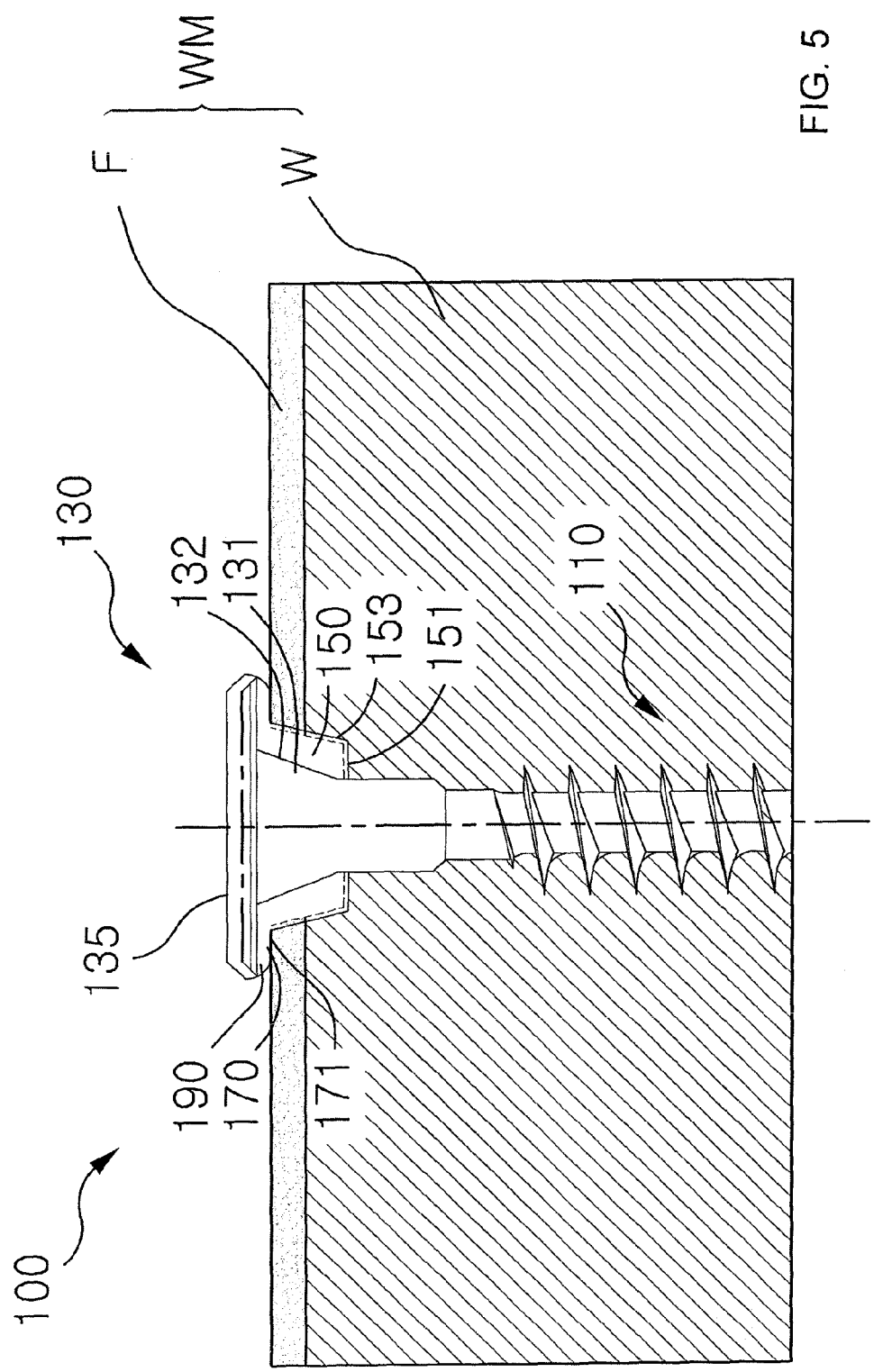
FIG. 5 is a conceptual diagram illustrating a process of secondarily removing the film F with a horizontal blade 170, with the screw 100 of FIG. 4 further driven.

FIG. 5 is a conceptual diagram illustrating a process of secondarily removing the film F with the horizontal blade 170, with the screw 100 of FIG. 4 further driven.

Referring to FIG. 5, the screw 100 is further turned and the side 153 of the tapered blade 150 additionally cuts the film F sequentially after the bottom 151. Although the side 153 is not parallel, with the film F, it cuts the film F, which is held by the bottom 151, does not come off due to inertia.

The tapered blade 150 cuts the film F and also cuts into the wood W. Accordingly, the load when the head 130 cuts into a wooden member WM can be reduced.

Next, the horizontal blade 170 comes in contact with the film F, as illustrated in FIG. 5. Accordingly, the horizontal blade 170 can secondarily cut the film F. Similar to the primary cutting, the entire surface of a portion of the film is removed like grinding by the bottom 171 of the horizontal blade 170.

The horizontal blade 170 cuts the film F and also cuts into the wood W. The horizontal blade 170 is positioned radially outside further than the tapered blade 150, so it cuts into the area into which the tapered blade 150 cannot cut. Accordingly, the area cut by the tapered blade 150 and the horizontal blade 170 substantially corresponds to the area where the disc portion 135 is placed. Accordingly, the load when the head 130 cuts into a wooden member WM can be reduced.

Figure 6:
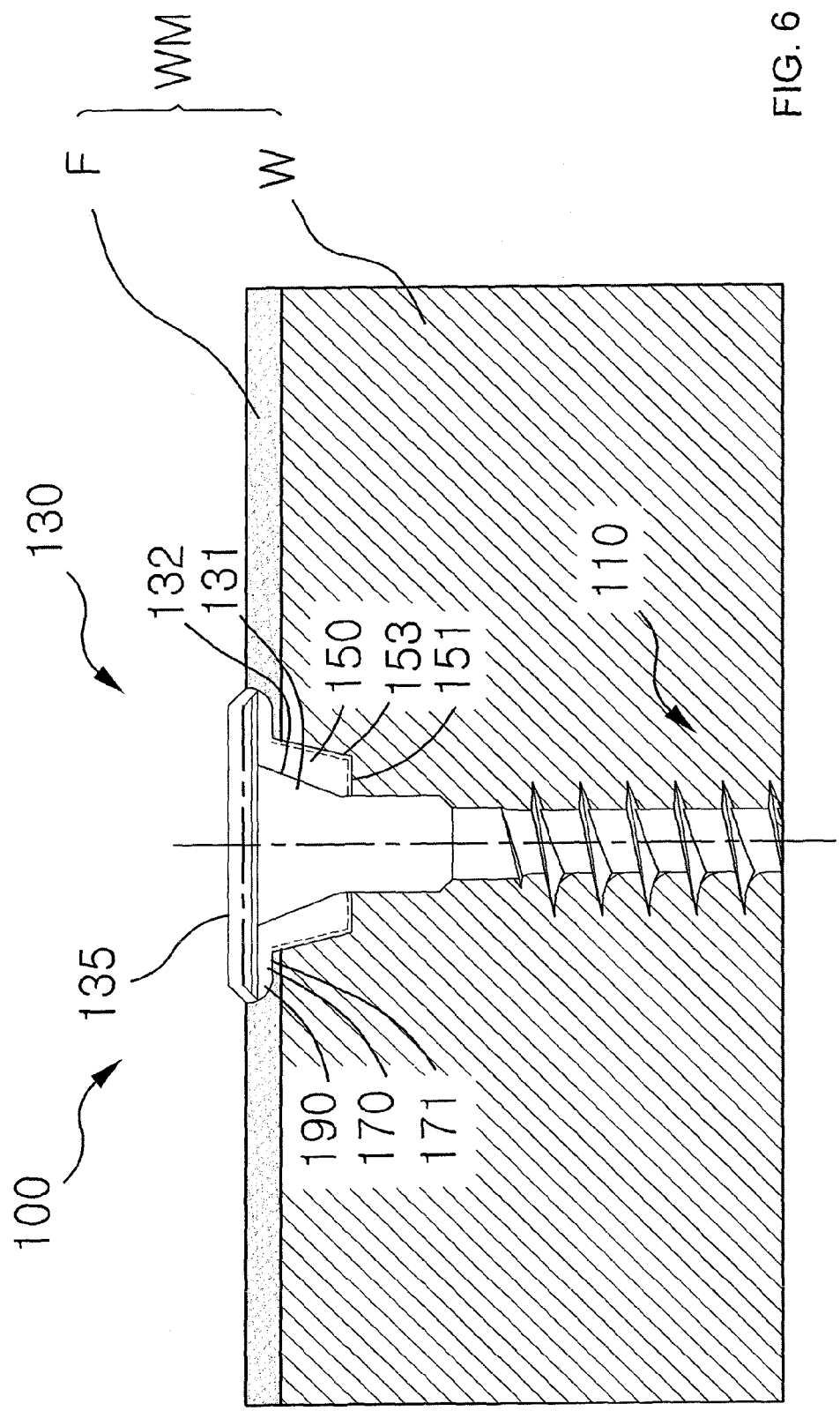
FIG. 6 is a conceptual diagram illustrating a process of thirdly removing the film F with a circular blade 190, with the screw 100 of FIG. 5 further driven into the wood W.

FIG. 6 is a conceptual diagram illustrating a process of thirdly removing the film F with the circular blade 190, with the screw 100 of FIG. 5 further driven.

Referring to FIG. 6, after the film F is primarily cut by the tapered blade 150 and then secondarily cut by the horizontal blade 170, as the screw 100 is further driven, the circular blade 190 thirdly cuts the film F.

The circular blade 190 has no blade parallel with the film F, such as the bottom 151 of the tapered blade 150 and the bottom 171 of the horizontal blade 170. Instead, it is a blade perpendicular to the film F, so it cutting off a portion from another portion by being punched into the film F. Accordingly, a portion of the separated film F is placed in a space surrounded by the circular blade 190. Therefore, the film F is cleanly cut off along the boundary of the disc portion 135.

Figure 7:
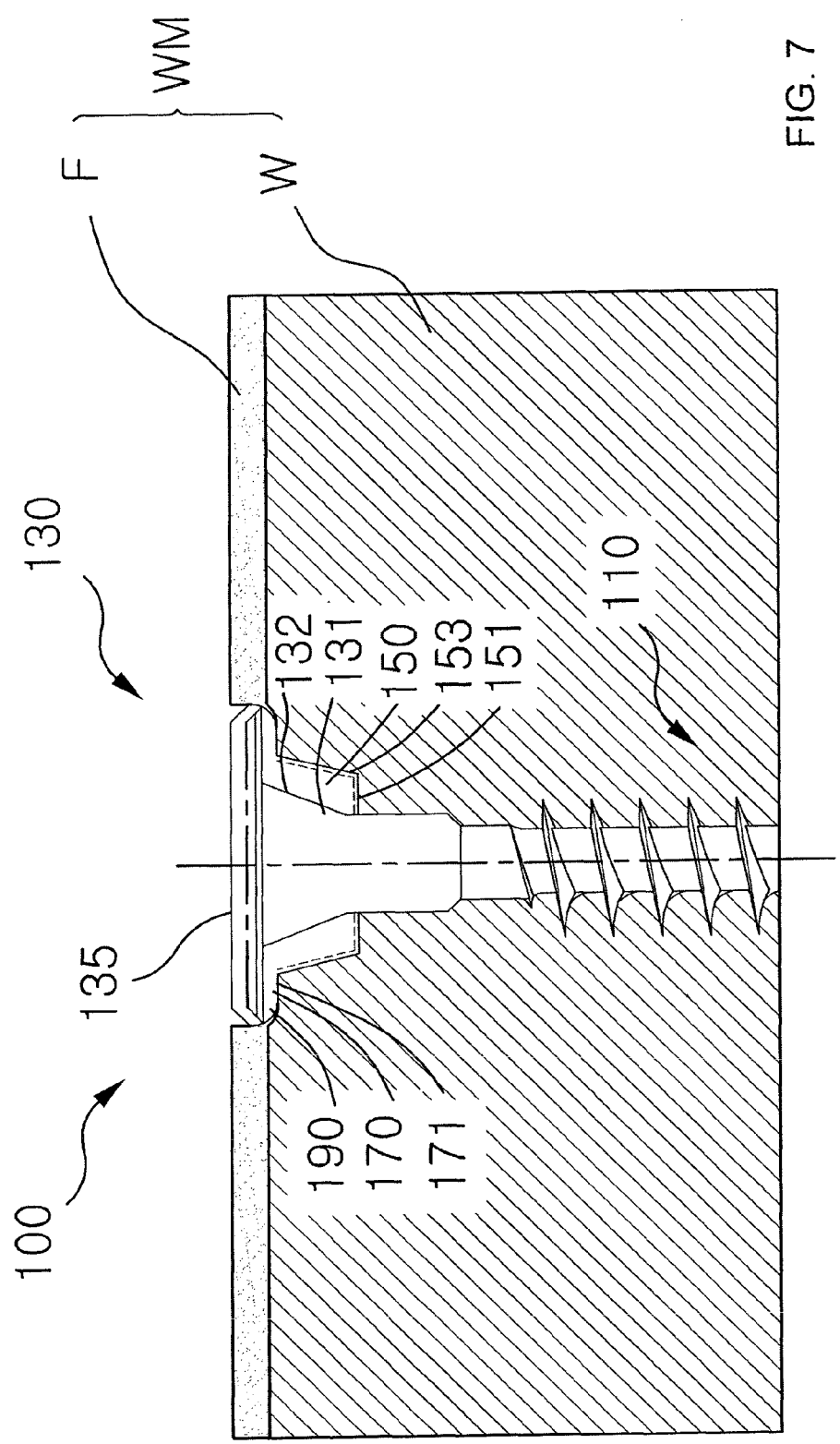
FIG. 7 is a conceptual diagram illustrating a head 130 fully driven in a wood W with the film F removed by further driving the screw 100 of FIG. 6.

FIG. 7 is a conceptual diagram illustrating a head 130 fully driven in the wood W with the film F removed by further driving the screw 100 of FIG. 6 into the wood W.

Referring to FIG. 7, the screw 100 is further driven in the wooden member WM and the top of the disc portion 135 is positioned in the film F. In this finally fastened state, it can be seen that the film F is finished cleanly without being wrinkled or torn around the disc portion 135.

According to the screw for fastening a wooden member of the present invention, it is possible to cleanly finish the portion in which the screw is driven, by effectively removing a film on a wooden member.

Further, when the screw is driven into a wooden member, a load applied to the wooden member can be reduced throughout the process, including not only the earlier step of putting the shank into the wooden member and the latter step of putting the head into the wooden member.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A screw for fastening a wooden member, comprising:
    a shank extending along a datum line;
    a head disposed at an end of the shank and having a plate portion having a cross-section that narrows as the plate portion extends to the shank such that a boundary of the cross-section and the datum line forms a plate angle; and
    a tapered blade protruding from the boundary of the plate portion, the tapered blade having a bottom that is perpendicular to the datum line and a side that forms an obtuse angle with the bottom, and having a taper angle that is made by the side and the datum line and is 2.5° to 12.5° smaller than the plate angle.

2. The screw of claim 1, wherein the plate angle is 27.5° to 30°.

3. The screw of claim 1, wherein the shank has a threaded portion with a thread thereon, and the bottom of the tapered blade is positioned at a distance corresponding to one pitch to one and a half pitch of the thread further from the head than a bottom of the plate portion.

4. The screw of claim 3, wherein the shank further has a neck connecting the threaded portion and the plate portion to each other, and
    the neck has a reinforcing portion haying an outer diameter which is larger by 6.5% to 8% than a remaining portion of the neck.

5. The screw of claim 1, wherein the head further has a disc portion connected to a free end of the plate portion and having a larger cross-sectional area than the plate portion.

6. The screw of claim 5, further comprising a horizontal blade protruding from a bottom of the disc portion and connected to the tapered blade.

7. The screw of claim 6, wherein the horizontal blade protrudes from the disc portion by 25% to 45% of a thickness of the disc portion.

8. The screw of claim 6, further comprising a circular blade protruding from the bottom of the disc portion and forming a circle.

9. The screw of claim 8, wherein the circular blade is formed such that an edge of the disc portion is bent to form an arc cross-section toward the shank.

10. The screw of claim 8, wherein the tapered blade and the horizontal blade are disposed inside a range defined by the circular blade, in a range of the disc portion.

11. The screw of claim 8, wherein the horizontal blade protrudes from the disc portion further than the circular blade.

12. The screw of claim 6, wherein the bottom of the tapered blade is parallel with a bottom of the horizontal blade.

13. The screw of claim 5, wherein a length of the bottom of the tapered blade is 7.5% to 12.5% of a radius of the disc portion.

14. The screw of claim 1, wherein a thickness of the tapered blade is 0.25 to 0.35 mm.

15. The screw of claim 1, wherein the shank further has an end blade that is formed at a free end of the shank and has an internal angle of 50° to 60°.

16. A screw for fastening a wooden member, comprising:
- a shank extending along a datum line and having a threaded portion with a thread thereon and an end blade formed at one end;
- a head disposed at the other end of the shank and having a plate portion, which has a cross-section that narrows as the plate portion extends to the shank such that a boundary of the cross-section and the datum line form a plate angle, and a disc portion at a free end of the plate portion;
- a tapered blade protruding from the boundary of the plate portion, having a bottom that is perpendicular to the datum line and a side that forms an obtuse angle with the bottom, and having a tapered angle smaller than the plate angle;
- a horizontal blade protruding from the bottom of the disc portion and having a bottom which is parallel with the bottom of the tapered blade; and
- a circular blade protruding from the bottom of the disc portion and surrounding the tapered blade and the horizontal blade.

17. The screw of claim 16, wherein the bottom of the tapered blade is positioned at a distance corresponding to one pitch to one and a half pitch of the thread further from the head than the bottom of the plate portion.

18. The screw of claim 17, wherein the shank further has a neck connecting the threaded portion and the plate portion to each other, and the neck has a reinforcing portion having an outer diameter larger by 6.5% to 8% than a remaining portion of the neck.

19. The screw of claim 16, wherein a length of the bottom of the tapered blade is 7.5% to 12.5% of a radius of the disc portion.

20. The screw of claim 16, wherein the plate angle is 27.5° to 30° and the tapered angle is 17.5° to 25°.

* * * * *